June 7, 1938.                P. B. AGNEW                2,120,140
                        SYNCHRONIZING APPARATUS
                          Filed Oct. 4, 1934
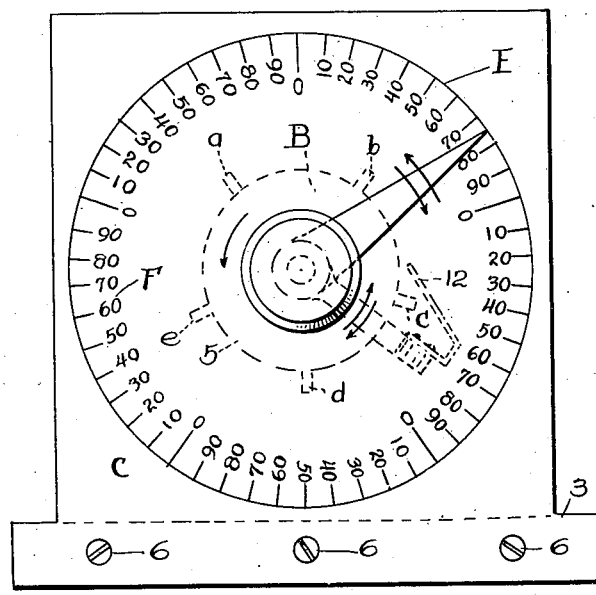
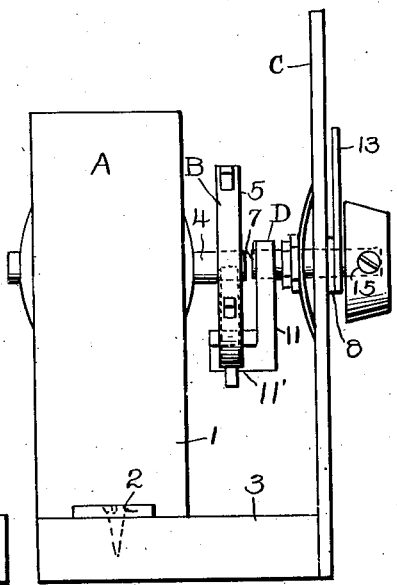
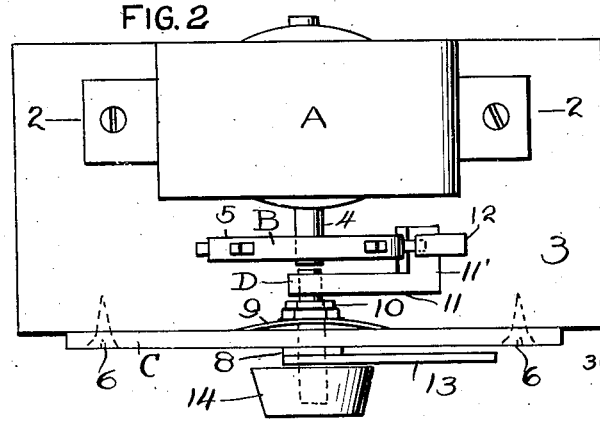
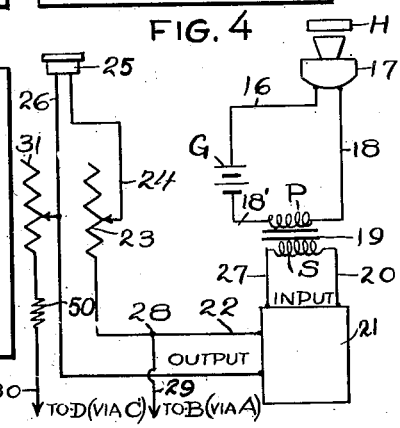
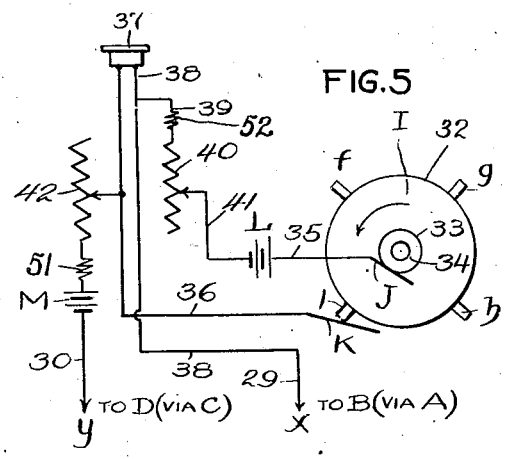
Inventor
Prentiss Boyd Agnew
By Shreve, Crowe & Gordon
Attorneys

Patented June 7, 1938

2,120,140

UNITED STATES PATENT OFFICE 2,120,140

SYNCHRONIZING APPARATUS

Prentiss Boyd Agnew, Atlanta, Ga.

Application October 4, 1934, Serial No. 746,920

1 Claim. (Cl. 181—0.5)

Generically this invention relates to a measuring or calibrating device, but is more particularly directed to a device for determining the error in the running of machines by the synchronization of sounds.

One of the principal objects of this invention is the provision of a device for determining the amount of and the direction of the error in the running of watches and also of clocks whose operations, as time-keeping devices, are controlled by balance wheels or pendulums.

Another important object of this invention is the provision of a device for determining the amount of and the direction of the error in the frequency of alternating current supply systems.

A still further important object of this invention is the provision of a device for determining the amount of and the direction of the error in the running of rotary machines which are designed for constant speed operation.

When used as a device for making these tests on watches or clocks and the like it consists essentially of two parts; the one, an electrical circuit containing a microphone and a receiver so arranged that when the watch or clock to be tested is placed near the microphone the sound of the beats or ticks can be heard by the ear in the receiver; the other, a synchronous motor which is used as a "master" device and is connected to the microphone-receiver circuit through an adjustable contact in such a manner that the operation of the motor from a power supply of the proper frequency will produce other beats in the receiver which are of the correct frequency for those of the watch or clock under test. By listening to the two kinds of beats and with the aid of the adjustable contact assembly, the graduated dial, a calibration table and another time-keeping device, both the direction and the amount of the error can be quickly and accurately determined. The synchronous motor may, however, be replaced by some other mechanical device whose rate of motion is regulated to the proper precision and is capable of making electrical contacts or causing electrical impulses which are of the proper frequency and which can be shifted in or out of phase with those of the apparatus under test.

When used as a device for making the tests on the frequency of alternating current systems, or on rotary machines and the like, it also consists of two parts whose functions are similar to those just described; however, the apparatus required and often the circuit arrangements necessary are somewhat different as will be noted from the descriptions contained herein.

With the above and other objects in view, which will become apparent as the description proceeds, the invention resides in the construction, combination and arrangement of parts, hereinafter more fully described and claimed, and illustrated in the accompanying drawing, in which like characters of reference indicate like parts throughout the several figures, of which:

Fig. 1 is a front elevation showing the dial, the indicator hand, the rotary switch and certain parts of the adjustable contact assembly.

Fig. 2 is a top plan view illustrating the assembly of the dial, the adjustable contact, the rotary switch and the synchronous motor.

Fig. 3 is an end view of Fig. 2.

Fig. 4 is a diagram of the microphone-receiver circuit employed in connection with the testing of watches and clocks, and the frequency of alternating current systems.

Fig. 5 is a diagram of the circuit arrangement for the testing of rotary machines.

The devices of this general character with which I am familiar have proven deficient in many respects, one of the principal defects being that the beats or impulses of what may be termed the "master" device could not be shifted in or out of phase with those of the apparatus under test, which renders necessary the use of complicated circuit arrangements and very delicate mechanical parts in order to determine the direction of the error; another principal defect being that a single "master" device could be used for only one beat-frequency, rendering it necessary to provide a separate "master" whenever apparatus designed to produce a different number of beats per second was to be tested. Therefore it was to provide accurate and efficient methods for making the tests described herein, without such deficiencies that I designed the device forming the subject matter of this invention.

In the illustrated embodiment characterizing this invention there is shown an electrical synchronous motor A, a rotary switch mechanism B connected therewith, a graduated metallic dial member C and an adjustable contact mechanism D carried by the dial member.

The small synchronous motor A, which is of conventional construction and which may be similar to the motor used in a synchronous electric clock, is housed in a suitable casing 1, in the present instance, rectangular in configuration and formed at each end with lateral flanges 2 adapted to be suitably bolted or otherwise secured to a base plate 3 formed either of insulating or conducting material, though in the latter case the motor and also the dial plate C referred to below should be insulated from the base. Projecting from said casing is motor shaft 4, and mounted on its free end, keyed or otherwise suitably secured thereto, is the rotary switch mechanism B comprising wheel or disk member 5 formed with a series of equi-spaced radially extending contact arms, a, b, c, d, and e. The shaft 4 with switch mechanism B is adapted to have the proper speed of revolution for the device being tested. In practicing my invention I may elect to have the shaft 4 driven by the motor A through suitable adjustable speed change gearing, said gearing is not shown since the use of such gearing for the increase or decrease in speed of rotation of shafts is so generally understood and so widely used.

Secured to one end of base plate 3 by screws 6 is the dial plate C, in spaced relation with respect to motor A, formed on its face with a dial E, which is divided into five major divisions, each division being sub-divided into 100 parts and every tenth part numbered. It will be noted that the switch B has five contact points a, b, c, d, and e, which correspond with the five major divisions F on the dial E, and while this number has been chosen for operating reasons it is to be understood that the number can be varied according to the particular operating requirements without departing from the spirit of the invention.

The adjustable contact mechanism D carried by the dial plate C comprises shaft 7 which is suitably journalled in said dial plate C in exact longitudinal alignment with shaft 4, and is formed with a flange 8 on one side of said dial plate and has spring washer 9 mounted thereon and adapted to contact the opposite side of dial plate C against which said washer is securely maintained by lock nuts 10 threadedly mounted on shaft 7 and by which means said shaft is held in place. Keyed or otherwise securely fastened to the opposite or inner end of shaft 7 is an arm 11 formed at its free end with a right angle extension 11' to which is suitably secured an outwardly and upwardly extending contact spring 12 the free end of which is adapted to be engaged by the respective contacts a, b, c, d, and e during each revolution of switch B, as and for a purpose hereinafter more fully appearing.

Closely fitted on the shaft 7 adjacent to the flange 8 is a hand 13 whose resistance with the shaft is such that normally it will turn with the knob 14 which is secured to the free end of said shaft by set screw 15, yet sufficiently loose to permit being slipped manually in either direction. The mechanism D can be turned manually in either direction by knob 14. The lock nuts 10 are adapted to be so adjusted that the knob 14 can be readily turned though offering sufficient resistance that mechanism D will remain set in position when the turning is discontinued and also affording sufficient pressure of flange 8 against dial plate C to insure a good electrical connection. Adjustment of contact spring 12 should be such that there will be just sufficient pressure of this spring against the switch points a, b, c, d, and e when the switch mechanism is rotating for good electrical contacts. The microphone-receiver circuit diagram illustrated in Fig. 4 and in which is mounted the motor and rotary switch assembly A—B and the dial plate and adjustable contact mechanism C—D will now be traced.

In the circuit diagram illustrated in Fig. 4 there is shown a primary circuit wherein the current flows from battery G or other source of power through conductor 16, microphone 17, conductor 18, primary coil P of impedance matching transformer 19, conductor 18', back to the source of power G. Any variation in the flow of current in the primary circuit just described will induce a current flow through the secondary coil S of transformer 19, conductor 20, the primary coil of the input transformer (not shown) of amplifier 21, conductor 27, and back to coil S of transformer 19. This will result in impressing voltages upon the grids of the vacuum tubes (not shown) in amplifier 21, which will in turn cause a similar variation in the flow of current from the output of this amplifier, through conductor 22, volume control 23, conductor 24, receiver 25, conductor 26, and back to the amplifier. Since the audible beats or impulses of a watch, clock or other device to be tested when placed near the microphone will cause such variations in the flow of current in the primary circuit by effecting slight changes in the resistance of the microphone, which will in turn, as referred to above, cause similar variations in the flow of current in receiver 25, the beats or impulses of a device H so placed will be heard in the receiver 25. It will be noted from the above that definite directions in the flow of currents through the secondary circuit, which includes coil S, etc., and also from the output of the amplifier 21 have been assumed. This has been done, however, merely to trace the circuits; the actual directions of flow depend upon the conditions prevailing or the construction of the apparatus or both.

To the section of circuit just described between amplifier 21 and receiver 25 there is connected through leads 29 and 30 another circuit in bridged or parallel relation, the object of the latter circuit being to transmit to the receiver for synchronization with the beats or impulses of the apparatus H under test, the beats or impulses caused by the making of contacts by the points a, b, c, d, and e on the rotary switch B with the spring 12 causing the receiver 25 and amplifier 21 to be momentarily shunted by resistance 50 when the motor A is running. This circuit will now be described.

When such a contact is made direct current will flow from the output of amplifier 21 through one of its two conductors, suppose it be number 22, to point 28, through conductor 29 to the motor A, to the rotary switch B, which is grounded to the motor, through a contact point, a, b, c, d, or e, to the adjustable contact assembly D via the spring 12, of which it is a part, to the dial plate C against which D is firmly pressed, through conductor 30, resistance 50, volume control 31 and conductor 26 back to the other side of the output of amplifier 21. This flow of current will result in changing the amount of current flowing through the receiver 25 and will thus result in producing a beat in the receiver. These beats will of course be produced as often as such contacts are made, since the making of contact between the spring 12 and contacts a, b, c, d and e will cause the receiver 25 and the amplifier 21 to be momentarily shunted by resistance 50. It is of course necessary for this operation that the output of the amplifier to have a direct current component such as would ordinarily result from the output or plate circuit of a thermionic tube amplifier. If I elect to equip amplifier 21 with an output transformer as is well known to the art or arrange it otherwise to prevent the flow of direct current in the output circuit 22, or if an amplifier is not used at all as referred to later, I would insert a battery or other low voltage source of electricity in series with the circuit of which conductor 30 forms a part in order to produce the beats in receiver 25 when the contacts of B and D are made. Fig. 5, which shows another application of my invention to be described below, shows such a battery connected in conductor 30.

*Method of operation.—When used as a device for testing watches or clocks*

By referring to Fig. 4, which is a drawing of the circuit layout, and also to the descriptions contained in the foregoing, it can be seen that any sound produced near the microphone will be registered in the receiver. The function of the impedance matching transformer is to obtain maximum efficiency from the microphone, that of the amplifier to increase the volume of this sound registered in the receiver, and that of the volume control 23 to adjust this sound in the receiver to the proper intensity. This amplifier, however, is usually not required for clocks or the larger watches.

When the motor "A" is running the rotary switch B is rotating and the points a, b, etc., are making contacts with the contact spring 12. As shown here a total of five contacts are made between the spring and the points for each revolution of B. As the motor and the plate C are normally insulated from each other the making of these contacts results in momentarily connecting these parts electrically, and as they are bridged through resistance 50 across the microphone-receiver circuit described above a sound or click will be heard in the receiver whenever a contact is made.

Let it be assumed that a watch designed to have 300 beats or ticks per minute is to be tested. (This is now the standard for most high grade watches the world over.) In this case the switch B would be geared by gearing not shown but mentioned above to the motor to turn one revolution per second or 60 per minute and would thus produce 5×60 or 300 clicks in the receiver per minute.

In preparing to determine the error the watch to be tested should be placed near the microphone and the volume control 23 adjusted until the beats of the desired volume are heard in the receiver. The motor should then be started and the volume control 31 adjusted until the clicks or beats produced in the receiver by the making of the contacts referred to above, caused by the receiver 25 and amplifier 21 being momentarily shunted by resistance 50, are approximately the same loudness as the beats of the watch.

Thus two sets of beats will be produced in the receiver. If at the same instant, this condition being referred to hereafter as synchronism or synchronization, they will be heard at the rate of 300 per minute, and will be a combination of the two types. If produced at different instants both types of beats will be heard and at the rate of 600 per minute. If the watch is running in error the beats will synchronize at regular intervals. Suppose synchronism occurs once each minute. In this case the watch would run in error one three-hundredth part, and the total error in 24 hours would be $$\frac{1440 \text{ (No. minutes per day)}}{300 \text{ (No. ticks per minute)}} = 4.8 \text{ minutes}$$

In like manner if it occurs once every fifteen seconds the error would be 19.2 minutes, if in thirty seconds 9.6 minutes, if in two minutes 2.4 minutes, and if in five minutes .96 minute, etc.

By turning the adjustable contact D by means of the knob 14 synchronism or non-synchronism can be produced at will, this being the result of changing the instants at which the contacts are made by the rotary switch B.

Suppose the beats of the watch under test do not normally synchronize with the beats produced by the rotary switch B more than once in approximately 15 seconds and that the knob 14 is turned until synchronization is obtained; and suppose also that after a short time the beats are slightly apart. By turning the knob in one direction the beats will become further apart but by turning it a small amount in the opposite direction they will again be synchronized. If this synchronization is obtained by turning the knob in a clockwise direction when using the arrangement shown in Fig. 1 the watch H under test would be running fast, but if in a counter-clockwise direction it would be running slow.

For a watch whose beats normally synchronize in less than approximately 15 seconds, the procedure for determining the direction of its error is the same as outlined in the foregoing except that it will usually be found desirable to turn the knob continuously, holding the two sets of beats together until the proper direction for turning is determined.

The error in the running of the watch should now be determined in accordance with the instructions given in the foregoing or in the succeeding paragraph as follows:

(a) Determine the direction or error.
(b) Determine the time for complete synchronization of beats, or as referred to below, a certain percent of synchronization.
(c) From the data obtained under (a) and (b) read the error directly from a calibration table.

If the synchronization requires more than one minute, it will usually be desirable in order to save time to first synchronize the beats as before, and then slip the hand 13 to one of the zeros. After the beats become slightly apart the knob 14 should be turned until synchronization is again obtained. As the turning of the knob also turns the hand, its reading in one hundredth part divisions from this zero will indicate the percent of synchronization and the error can be obtained from the table in the same manner as before.

The calibration table or chart referred to, which would be used in connection with this device, would indicate the amount of error in the running of the watch or clock under test during a fixed time, ordinarily 24 hours, from the data obtained in the operation of the device.

*Method of operation.—When used as a device for testing the frequency of alternating current systems*

When making these tests the circuit arrangement shown in Fig. 4 should be used and the error is determined in the same manner as above described for watches or clocks with the following exceptions:

(a) A standard watch or clock instead of one to be tested is placed near the microphone.
(b) The indication of the direction of error is opposite to that in the other case.
(c) A different calibration table is required.

For example, suppose synchronism occurred every three minutes when using a standard timepiece having 300 beats per minute. In this case the frequency of the system would be $$\frac{1}{300 \times 3}$$

or 1/900 part off. For a 60 cycle system this would correspond to an error of $$\frac{60}{900}$$

or .0667 cycle per second.

Testing of Rotary Machines

*Description of special arrangements required*

When it is desired to test the R. P. M. of rotary machines designed for constant speed operation such as a generator, a phonograph motor and the like, the mechanism under test must be adapted to produce the beats, and the circuit arrangement and hookup as illustrated in Fig. 5 may be employed. The rotary switch mechanism I is similar to switch B heretofore described and comprises disk 32 formed with radially extending contact arms $f$, $g$, $h$, and $i$, and with a hub or flange portion 33 which is suitably connected to shaft 34 or other rotating part of the machine to be tested and the operation of said switch mechanism is similar to that of the rotary switch B heretofore described. The brush J suitably mounted adjacent to said switch is adapted to bear securely against the flange 33 so as to make a good electrical connection therewith and the contact points of arms $f$, $g$, etc. make contacts in regular sequence with the contact spring K as the disk rotates, as will be well understood. Spring member K is also suitably mounted adjacent to said switch. The current flows from battery L, through conductor 35, brush J, flange 33, disk 32, contact points $f$, $g$, $h$, and $i$ respectively, spring K, conductor 36, receiver 37, conductor 38, conductor 39, resistance 52, volume control 40, conductor 41, back to battery L and through this circuit the beats from mechanism I in accordance with R. P. M. of shaft 34 may be heard in receiver 37. The circuit diagram in Fig. 5 from point X of conductor 29, through mechanism A—B and D—C, to point Y of conductor 30 is identical with the circuit described in Fig. 4. The current flows from battery M through resistance 51, volume control 42, conductor 36, receiver 37, conductor 38, conductor 29, to X, through the mechanism A—B and C—D to point Y, through conductor 30, back to the other side of the battery, and through this circuit the beats or impulses from switch B of motor A may be heard in receiver 37 for synchronization with the beats or impulses from switch I, which, as shown, is connected to the rotary machine being tested. It is the purpose of resistance 51 to prevent impulses from B completely masking those from J when the resistance of volume control 42 is reduced to zero, and likewise 52 prevents those from J masking those from B when the resistance of volume control 40 is reduced to zero.

*Method of operation.*—When used as a device for testing rotary machines

It will thus be seen that the arms $f$, $g$, $h$, and $i$ make contacts in regular sequence with the contact spring K as the disk 32 rotates. The making of these contacts momentarily connects together electrically the brush J and spring K and also the two leads to which these are attached, and on account of the battery L being in this circuit causes beats in the receiver. Likewise due to the battery M being in the motor circuit contacts made by the turning of the rotary switch B will also cause beats in the receiver in the same manner. By having the switch B operated by the motor at the proper speed, these beats will be of the correct frequency for those of the machine under test.

With both the machine shaft 34 and the synchronous motor A running and the volume controls 40 and 42 adjusted until beats of the proper volume are heard in the receiver the error in the running of the machine is determined in precisely the same manner as for a watch or clock; however, as in the testing of the latter, the calibration table used must be designed so as to be applicable to the machine.

For example, suppose the disc 32 is attached to a phonograph motor which is designed to turn 78 revolutions per minute. As it is shown equipped with four contact points the synchronous motor with associated gearing mentioned above would be operated to make 78×4 or 312 contacts per minute. Suppose also that synchronism occurred once every 10 seconds. In this case the phonograph motor would be running one revolution in error every 40 seconds $$\frac{(10 \text{ sec.})}{1/4}$$

or one and one-half revolutions per minute.

Due to the similarity of rotary switches B and I it would be practical when testing rotary machines to have the adjustable contact mechanism in the circuit with the latter switch and the fixed contact in the former, instead of the reverse arrangement as shown. The tests would then be made in the same manner as those described though the indication of the direction of error would be opposite to that in the other case.

From the above it will be apparent that I have designed a unique device for determining the error in the running of machines by the synchronization of sounds, simple in construction, versatile in its adaptive use, manufacturable at a minimum cost, and efficient for the purposes intended.

Although in practice I have found that the form of my invention illustrated in the accompanying drawing and referred to in the above description as the preferred embodiment is the most efficient and practical, yet realizing that conditions concurrent with the adoption of my invention will necessarily vary, I desire to emphasize that various minor changes in details of construction, proportion and arrangement of parts, may be resorted to in the scope of the appended claim without departing from or sacrificing any of the principles of this invention.

Having thus described my invention, what I desire protected by Letters Patent is as set forth in the following claim:

An apparatus for comparing an operation of a master device with that of a watch and the like comprising a microphone, a microphone circuit, an amplifier, an input circuit for the amplifier, means inductively coupling the microphone circuit to the amplifier input circuit, whereby to transfer the signals set up in said microphone circuit to said amplifier input circuit, an amplifier output circuit including a receiver and connected with the amplifier, said amplifier output circuit being adapted to receive amplified signals at the frequency of the input signals, a master device circuit, and means in said master device circuit for producing signals at a predetermined frequency, said means including a rotary switch comprising a motor driven shaft, a disk keyed to the shaft, a series of circumferentially spaced arms radially projecting from the periphery of said disk and constituting a plurality of rotary contacts, a normally stationary adjustable contact positioned in the path of and adapted to be engaged by said rotary contacts, means connecting said master circuit to the output circuit of said amplifier, said means including a variable resistance whereby signals at the frequencies of said master device circuit and said microphone input circuit are simultaneously impressed upon said amplifier output circuit, and means in connection with said switch for circumferentially adjusting said stationary contact with respect to said rotary contacts for the purpose of shifting the signal frequencies of the master device circuit into and out of phase with the signal frequency of the amplifier output circuit.

PRENTISS BOYD AGNEW.